(12) United States Patent
Xu et al.

(10) Patent No.: US 7,654,096 B2
(45) Date of Patent: Feb. 2, 2010

(54) REDUCED TORQUE VALVE FOR CRYOGENIC REFRIGERATOR

(75) Inventors: Mingyao Xu, Emmaus, PA (US); Jin Lin Gao, Allentown, PA (US); Eric Seitz, Allentown, PA (US); Motokazu Saito, Allentown, PA (US)

(73) Assignees: Sumitomo Heavy Industries, Ltd., Tokyo (JP); Sumitomo (SHI) Cryogenics of America, Inc., Allentown, PA (US)

( * ) Notice: Subject to any disclaimer, the term of this patent is extended or adjusted under 35 U.S.C. 154(b) by 459 days.

(21) Appl. No.: 10/580,917

(22) PCT Filed: Jan. 20, 2005

(86) PCT No.: PCT/US2005/001617

§ 371 (c)(1),
(2), (4) Date: May 30, 2006

(87) PCT Pub. No.: WO2005/072194

PCT Pub. Date: Aug. 11, 2005

(65) Prior Publication Data

US 2007/0119188 A1 May 31, 2007

Related U.S. Application Data

(60) Provisional application No. 60/537,661, filed on Jan. 20, 2004.

(51) Int. Cl.
*F25B 9/00* (2006.01)
*F16K 11/074* (2006.01)
*F16K 31/02* (2006.01)

(52) U.S. Cl. .................. 62/6; 137/625.46; 251/129.11

(58) Field of Classification Search .............. 62/6; 137/625.46; 251/129.11
See application file for complete search history.

(56) References Cited

U.S. PATENT DOCUMENTS

| 3,119,237 A | 1/1964 | Gifford |
| 3,205,668 A | 9/1965 | Gifford |
| 3,237,421 A | 3/1966 | Gifford |
| 3,620,029 A | 11/1971 | Longsworth |
| 3,625,015 A | 12/1971 | Chellis |
| 4,430,863 A | 2/1984 | Longsworth |
| 4,538,416 A | 9/1985 | Riedy |

(Continued)

FOREIGN PATENT DOCUMENTS

WO  02/077545  10/2002

OTHER PUBLICATIONS

PCT/ISA/210 International Search Report for corresponding PCT application PCT/US05/01617, dated Aug. 23, 2006.

(Continued)

*Primary Examiner*—William C Doerrler
(74) *Attorney, Agent, or Firm*—Katten Muchin Rosenman LLP (57) ABSTRACT

A rotary valve unit which reduces the torque required to turn the valve disc, and the amount of wear dust that is blown into the cold head, using differential gas forces to keep the valve disc in contact with the valve seat, and which enables larger diameter valve discs to be utilized for multi-ported pulse tubes that have less force on the face of the valve disc, resulting in reduced torque and reduced wear rate.

10 Claims, 7 Drawing Sheets

U.S. PATENT DOCUMENTS

| | | | |
|---|---|---|---|
| 4,987,743 | A | 1/1991 | Lobb |
| 5,361,588 | A | 11/1994 | Asami et al. |
| 5,878,580 | A | 3/1999 | Schilling et al. |
| 6,256,998 | B1 | 7/2001 | Gao |
| 6,460,349 | B1 * | 10/2002 | Kawano et al. .......... 62/6 |
| 2002/0066276 | A1 * | 6/2002 | Kawano et al. .......... 62/6 |
| 2004/0040315 | A1 * | 3/2004 | Koyama et al. .......... 62/6 |

OTHER PUBLICATIONS

PCT/ISA/237 Written Opinion of ISA for corresponding PCT application PCT/US05/01617, dated Aug. 23, 2006.

E.I. Mikulin et al., "Low temperature expansion pulse tubes", Advances in Cryogenic Engineering, vol. 29, 1984, p. 629-637.

S. Zhu et al., "Double inlet pulse tube refrigerators: an important improvement", Cryogenics, vol. 30, 1990, p. 514-520.

Y. Matsubara et al., "An experimental and analytical investigation of 4 K pulse tube refrigerator", Proceedings of the 7th International Cryocooler Conference, Air Force Report PL-CP-93-1001, 1993, p. 166-186.

S.W. Zhu et al., "Active-buffer pulse tube refrigerator", Proceedings of the 16th Cryogenic Engineering Conference, 1996, p. 291-294.

J. Yuan et al., "A single stage five valve pulse tube refrigerator reaching 32 K", Advances in Cryogenic Engineering, vol. 43, Plenum Press, New York, 1998, p. 1983-1989.

Third Office Action dated Oct. 9, 2009, from the corresponding Chinese Application.

* cited by examiner

REDUCED TORQUE VALVE FOR CRYOGENIC REFRIGERATOR

This application is the National Stage of International Application No. PCT/US2005/001617, filed Jan. 20, 2005, which claims the benefit under 35 U.S.C. 119 (a-e) of U.S. Provisional Application No. 60/537,661 filed Jan. 20, 2004, which is herein incorporated by reference.

BACKGROUND OF THE INVENTION

The present invention relates to cryogenic refrigerators, in particular, Gifford McMahon (GM) refrigerators, GM type pulse tube refrigerators, and Solvay refrigerators. Coldheads of such cryogenic refrigerators include a valve mechanism, which commonly consists of a rotary valve disc and a valve seat. There are discrete ports, which, by periodic alignment of the different ports, allow the passage of a working fluid, supplied by a compressor, to and from the regenerators and working volumes of the coldhead.

GM and Solvay type refrigerators use compressors that supply gas at a nearly constant high pressure and receive gas at a nearly constant low pressure. The gas is supplied to a reciprocating expander that runs at a low speed relative to the compressor by virtue of a valve mechanism that alternately lets gas in and out of the expander. U.S. Pat. No. 3,119,237 to Gifford shows an early pneumatically driven GM expander and a multi-ported rotary spool valve to control gas flow to the regenerator out of phase with gas flow to the drive piston. In a subsequent U.S. Pat. No. 3,205,668, Gifford discloses a multi-ported rotary disc valve that uses the high to low pressure difference to maintain a tight seal across the face of the valve. He states that this type of valve is superior to the spool type valve because the leak rate is lower, even after it has run a long time and has experienced some wear. This type of valve has been widely used in different types of GM refrigerators as shown for example in Longsworth U.S. Pat. No. 3,620,029, and Chellis U.S. Pat. No. 3,625,015.

This type of valve has the disadvantage of requiring an increased amount of torque as the diameter is increased to accommodate larger ports. Lobb, U.S. Pat. No. 4,987,743 describes a means of reducing the force on the face of the valve disc by having a plug in the back of the valve disc that is attached to the motor shaft. High pressure gas on the back side of the plug and low pressure gas in the cavity between the face of the plug and the central part of the back of the valve disc puts an axial load on the motor bearings, but reduces the force on the face of the valve disc. This results in a lower torque being required to turn the valve disc. The direction of force on the motor shaft is towards the valve seat.

Gifford also conceived of an expander that replaced the solid displacer with a gas displacer and called it a "pulse tube" refrigerator. This was first described in Gifford U.S. Pat. No. 3,237,421 which shows a pulse tube connected to valves like the earlier GM refrigerators. It also shows a pulse tube expander connected directly to a compressor so it pulses at the same speed as the compressor. This is equivalent to a Stirling cycle refrigerator.

Early pulse tube refrigerators were not efficient enough to compete with GM type refrigerators. A significant improvement was made by Mikulin et al., as reported in 1984, (E. I. Mikulin, A. A. Tarasow and M. P. Shkrebyonock, 'Low temperature expansion (orifice type) pulse tube', Advances in Cryogenic Engineering, Vol. 29, 1984, p. 629) and significant interest ensued in looking for further improvements. Descriptions of major improvements since 1984 can be found in S. Zhu and P. Wu, 'Double inlet pulse tube refrigerators: an important improvement', Cryogenics, vol. 30, 1990, p. 514; Y. Matsubara, J. L. Gao, K. Tanida, Y. hiresaki and M. Kaneko, 'An experimental and analytical investigation of 4K (four valve) pulse tube refrigerator', Proc. $7^{th}$ Intl Cryocooler Conf., Air Force Report PL-(P-93-101), 1993, p 166-186; S. W. Zhu, Y. Kakami, K. Fujioka and Y. Matsubara, 'Active-buffer pulse tube refrigerator', Proceedings of the $16^{th}$ Cryogenic Engineering Conference, 1997, p. 291-294; and J. Yuan and J. M. Pfotenhauer, 'A single stage five valve pulse tube refrigerator reaching 32K', Advances in Cryogenic Engineering, Vol. 43, 1998, p. 1983-1989.

All of these pulse tubes can run as GM type expanders that use valves to cycle gas in and out of the pulse tube, but only the single and double orifice pulse tubes have been run as Stirling type expanders. Stirling type pulse tubes are small because they operate at relatively high speed. The high speed makes it difficult to get to low temperatures so GM type pulse tubes running at low speed are typically used for applications below about 20 K. It has been found that best performance at 4 K has been obtained with the pulse tube shown in FIG. 9 of Gao, U.S. Pat. No. 6,256,998. This design has six valves which open and close in the sequence shown in Gao's FIG. 11.

In order to keep the valve disc in contact with the valve seat, in most of the prior art, the valve disc is located in a chamber, which is filled with high-pressure working fluid. Usually, this chamber is connected to the supply side of a compressor. This is shown in Gifford U.S. Pat. No. 3,205,668, Longsworth U.S. Pat. No. 3,620,029, Chellis U.S. Pat. No. 3,625,015, and Lobb U.S. Pat. No. 4,987,743.

Since the valve disc is in the chamber connected to the supply side of the compressor, the wear dust from the valve disc tends to be blown into the cold head itself, which degrades performance. The pulse tube refrigerator is more sensitive to the dust than a conventional GM refrigerator because this dust tends to stick on the surface of the needles which are used to adjust the opening of the orifices at the warm end of the pulse tube, or to accumulate in the orifices and flow passages. The performance of a pulse tube refrigerator is sensitive to the opening of the orifices, thus it is desirable to keep them free of dust. The tendency to blow dust into the ports on the valve disc is due to high pressure gas being on the outside blowing dust radially inward toward the low pressure regions in the center of the valve disc.

It has been found that less dust from the wear of the valve disc collects in the warm end of the regenerator and pulse tube orifices if the flow through the valve disc is reversed. That is to have high-pressure gas enter through the center of the valve disc face and discharge radially to low pressure on the backside of the valve disc. Asami et al. U.S. Pat. No. 5,361,588 shows an arrangement for a GM refrigerator where the high-pressure gas from the compressor acts against a valve seat to push it into the face of a rotary valve. A bearing is shown to hold the valve disc against the axial force of the valve seat, rather than transferring it as an axial load on the motor shaft. The flow of gas in this arrangement is reversed from the conventional arrangement shown in previous patents. Conceptually the conventional valve disc shown in FIG. 7 of Longsworth U.S. Pat. No. 3,620,029 could have the flow reversed if the spring that is shown would apply enough force to keep the valve disc seated.

It would be desirable to provide a valve unit that reduces the amount of dust blown into the cold heat and at the same time reduces wear on the valve and requires lower torque.

SUMMARY

A rotary valve unit has now been developed that is significantly different than the rotary valve described in Lobb U.S. Pat. No. 4,987,743, and which reduces the torque required to turn the valve disc, and the amount of wear dust that is blown into the cold head. This valve unit uses differential gas forces to keep the valve disc in contact with the valve seat, which enables larger diameter valve discs to be designed and utilized for multi-ported pulse tubes that have less force on the face of the valve disc. The reduced force on the face of the valve disc results in reduced torque and reduced wear rate.

This invention provides an improved means of reducing the torque required to turn a rotary disc valve that seals multiple ports by maintaining a net force that keeps the face of the valve disc in contact with the seat. This force is reduced relative to conventional valve discs that rely on the force due to high-pressure acting on the back of the valve disc being greater than the force on the face of the valve disc because it has low-pressure gas in the center. This invention provides means to reduce the axial sealing force by having gas at two different pressures acting on two different surfaces in the valve assembly. The sealing force is in a direction that would cause the valve disc to lift off the seat but an axial force against the motor shaft or a separate bearing restrains it.

It is possible to have high-pressure gas in the center of the valve seat and low-pressure gas on the outside of the valve disc. This provides a major advantage, especially in a multi-ported pulse tube, of significantly reducing the amount of dust, from the wear of the valve disc, which is blown into the pulse tube. Having the high pressure in the center of the valve disc face and low pressure on the outside results in most of the dust being blown directly to the low-pressure space and never entering the pulse tube. Reducing the sealing force also results in less dust being generated and longer valve disc life.

This invention includes having two different surfaces with two different pressures that are located either in the rotating valve disc or in the stationary valve seat. The gas pressures that must be different can be selected from the high-pressure, low-pressure, pulse tube buffer pressure, atmosphere, pressure in a sealed volume, or a pressure that is controlled between the high and low pressures in the compressor. It is also possible to bias the force mechanically, such as by means of a spring.

Applying the principal of differential force to push the valve seat against the valve disc can be applied to the conventional arrangement of having high-pressure gas out side the valve disc and low-pressure gas in the center of the valve face. This reduces the torque required to turn the valve disc but does not reduce the fraction of dust that is generated from getting into the pulse tube. Most embodiments of this invention differ from Lobb U.S. Pat. No. 4,987,743 in that the force on the motor shaft is not in the direction toward the sealing surface, but is in the opposite direction. This not only enables a lot of the wear dust to be blown out, but also enables the use of a separate bearing to carry the axial load instead of the motor bearings. Reducing the amount of dust that enters a pulse tube also improves the temperature stability.

DETAILED DESCRIPTION OF THE INVENTION

The present invention is applicable to any kind of refrigerator in which gas is cycled in and out of the expander by a valve unit, including G-M refrigerators, Solvay refrigerators, and G-M type pulse tube refrigerators. It is of particular value when applied to low temperature pulse tubes that have multi-stages and multi-ports.

Figure 1:
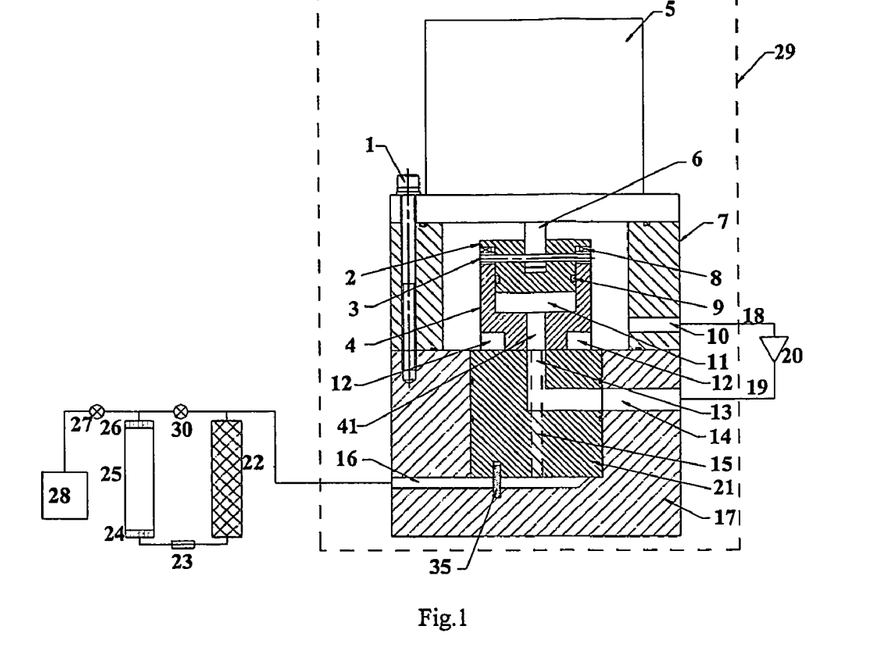
FIG. 1 is a cross section of a valve assembly in accordance with the present invention in which small schematics of the compressor and a single stage double inlet pulse tube refrigerator are included to show the flow relations. Differential pressures in the valve disc create the sealing force.

FIG. 1 shows a cross section of valve assembly 29 along with small schematics of the compressor and a single stage double inlet pulse tube refrigerator to show the flow relations.

Valve unit 29 has a valve motor assembly 5, a valve housing 7 and a valve base 17, all of which are sealed by means of a variety of 'O'-ring seals, and by bolts 1. Inside the valve base and housing, there are various components. A valve seat 21 is held and sealed within the valve housing. A valve disc 4 is turned by valve motor 5 through a motor shaft 6 and a pin 3 passing through shaft 6. Valve disc 4 is free to move axially relative to pin 3. Valve disc 4 is in contact with valve seat 21. Pin 3 also holds valve holder 2 which is sealed in valve disc 4 by an 'O'-ring 9. A spring 8 is used to keep valve disc 4 in contact with valve seat 21 when the refrigerator is off.

An outlet 10 is connected to the return side of compressor 20 through a gas line 18. The supply side of compressor 20 connects to valve assembly 29 through the gas line 19 and an inlet 14. Gas at high pressure then flows through channel 13 to the center of valve disc 4.

Figure 2:
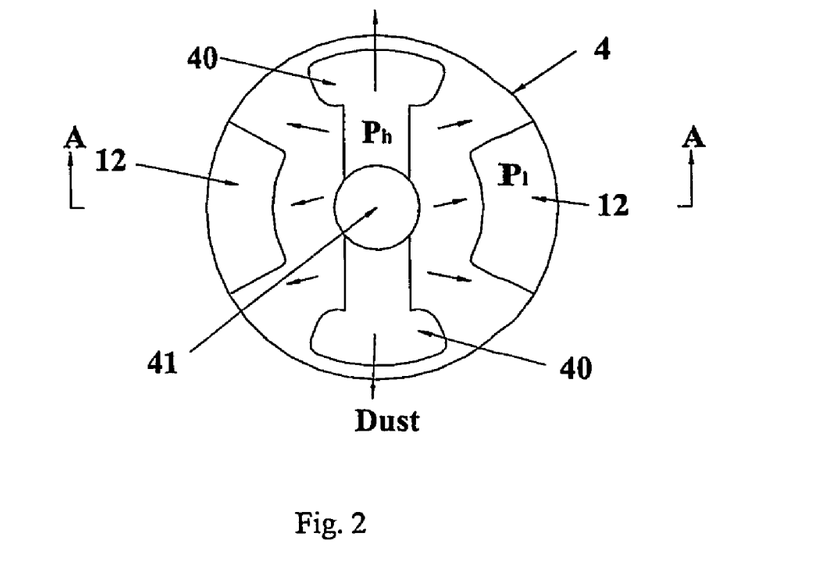
FIG. 2 is a face profile of a valve disc forming part of the valve unit of FIG. 1.

FIG. 2 shows the gas flow cavities in the face of valve disc 4. The cross section shown in FIG. 1 is noted by section arrows A-A in FIGS. 2 and 3. High-pressure, Ph, gas from channel 13 is distributed in cavity 40 while channel 41 connects high-pressure gas to cavity 11, FIG. 1. Regions 12 that are under cut in the outer edge of valve disc 4 connect to low-pressure, Pl, gas that returns to the compressor. When it is operating, the wear on the engaging surfaces of the valve disc 4 and the valve seat 21 tend to be blown out from the high-pressure region in cavity 40 to the low-pressure region around the outer edge of valve disc 4 and cavities 12.

Figure 3:
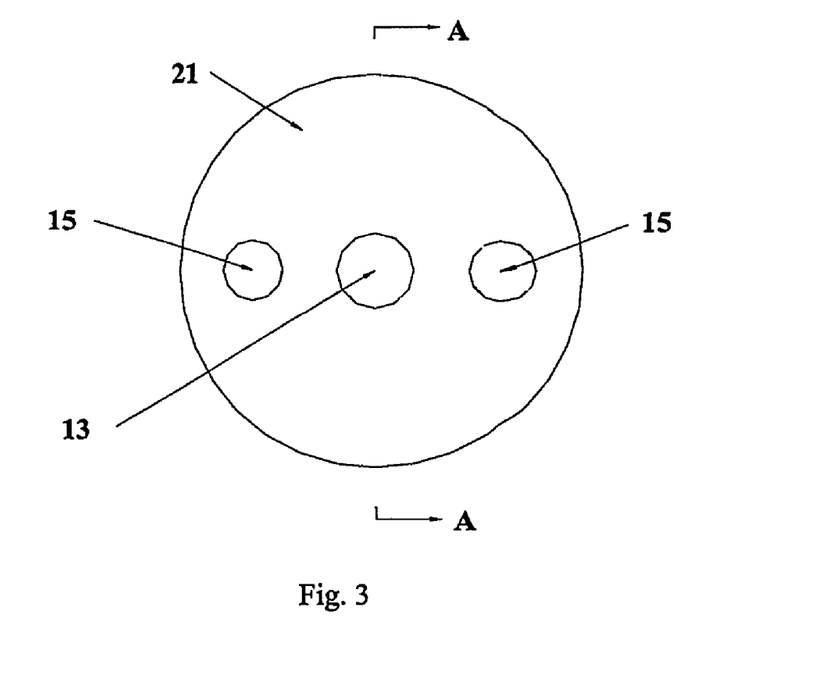
FIG. 3 is a face profile of the valve seat forming part of the valve unit of FIG. 1.

FIG. 3 shows the face of seat 21. Although not essential to an understanding of the invention, the nature of this porting will be briefly described with reference to FIGS. 1, 2, and 3. FIG. 1 shows a double inlet type pulse tube refrigerator driven by the invented valve unit. It consists of a regenerator 22, a pulse tube 25 with warm end flow smoother 26 and cold end flow smoother 24, a cold end heat exchanger 23. A phase shifter, which includes a buffer orifice 27, a double inlet valve 30, and a buffer volume 28. By rotating valve disc 4 against valve seat 21 by means of valve motor 5 and shaft 6, holes 15 and 16 are alternately pressurized by gas flowing through slots 40 and depressurized by flow through cavities 12. The porting shown in FIGS. 2 and 3 produce two complete cycles to pressurize and depressurize the pulse tube for every rotation of valve disc 4. It is to be understood that the expander can be operated with one, or more than one, cycle per cycle of the rotary valve by properly arranging the supply and return porting on valve disc 4 and valve seat 21. The discharge of flow from the expander into the motor housing has a tendency to blow wear dust out of the expander and thereby increases the reliability of the refrigerator.

The exterior surfaces of valve disc 4 and valve holder 2 are surrounded by low-pressure gas except for the surface of valve disc 4 that is in contact with valve seat 21. The pressure across the face of valve disc 4 has gradients between the high pressure in slot 40 and the outer perimeter, which is at low pressure. The pressure distribution across the face of valve disc 4 changes as it rotates and alternately has high-pressure gas flow into port 15 then lets low-pressure gas flow out. The force required to have valve disc 4 seal against the face of seat 21 is greatest when it seals ports 15 against high-pressure gas, and is minimum when the face of valve disc 4 seals ports 15 against low-pressure gas. The force required to have a seal across the face of valve disc 4 is obtained by having the product of the pressures and areas on the distal side of valve disc 4 be greater than the product of the maximum average pressure on the face of valve disc 4 and the area of the face of valve disc 4. This can be expressed in the form of an equation in which Ac is the area of the distal side of valve disc 4 in cavity 11, As is the annular area of the distal side of valve disc 4 around Ac, Av is the area of the face of valve disc 4, and Pv is the average pressure acting on Av (both including the area and pressure of cavity 12), as $$(Ac*Ph+As*Pl)>Av*Pv \max \qquad \text{Equation 1}$$

The opposing force is transmitted to motor shaft 6 and puts an axial load on the motor bearings in the direction away from valve disc 4. In practice the diameter of cavity 11 is adjusted by testing different sizes to see what gives the best balance between minimizing leakage and torque. Minimizing the torque also minimizes wear rate.

Although the expander shown in FIG. 1 is a single stage pulse tube, it is also possible to design the valve unit and porting so that it can be used to drive a multi-stage pulse tube with multiple control ports as shown for example in FIG. 9 of U.S. Pat. No. 6,256,998. By properly arranging the porting on the valve disc 4 and the valve seat 21, and by arranging necessary passages to communicate with the warm end 26 of the pulse tube 25, the invented valve unit can also be used to drive any type of pulse tube refrigerator, such as, orifice type, four valve type, active-buffer type and five-valve type. It must be pointed out that this valve unit can be used for other kinds of refrigerators, such as GM or Solvay types.

Figure 4:
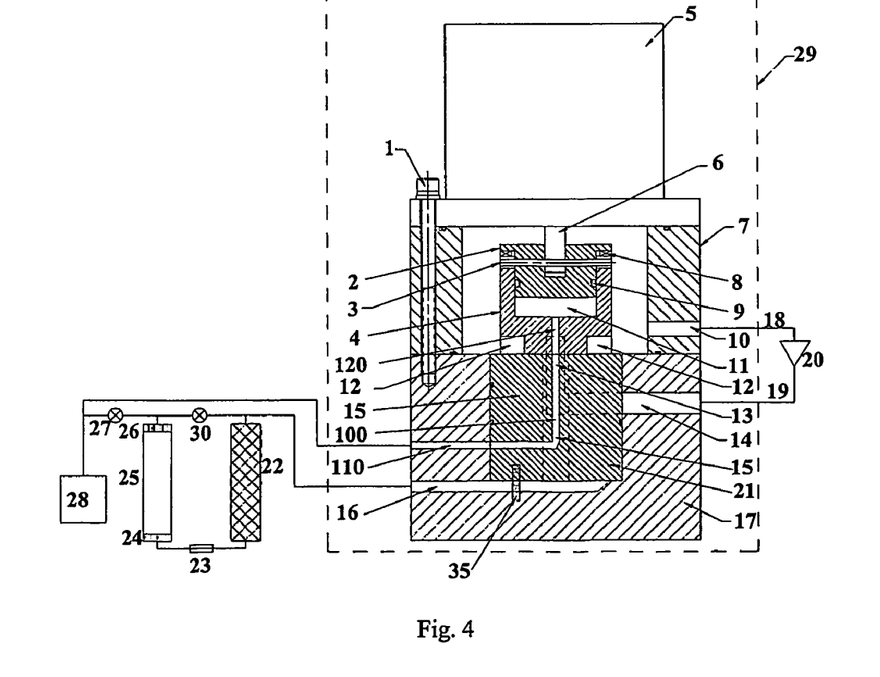
FIG. 4 is a cross section of a second embodiment of a valve assembly in accordance with the present invention in which buffer gas from the pulse tube provides one of the sealing pressures.

FIG. 4 shows another embodiment of the present invention in which gas from another part of the system is used to pressurize cavity 11. In FIG. 4 like reference numerals denote like parts in FIG. 1. Assuming that the pressure in cavity 11 is Pc then the criteria that has to be satisfied for sealing is, $$(Ac*Pc+As*Pl)>Av*Pv \max \qquad \text{Equation 2}$$

From equation 2 it is seen that Pc has to be large enough so the diameter required for cavity 11 is less than the diameter of valve disc 4. FIG. 4 shows cavity 11 communicating with the buffer 28, at pressure Pb, at the warm end of the pulse tube, through flow passages 100, 110 and 120. In a pulse tube refrigerator, the buffer has a pressure that is slightly above the average of Ph and Pl. It is also recognized that the pressure can be supplied by another means that controls the pressure between Ph and Pl at a value that minimizes the torque needed to turn valve disc 4.

Figure 5:
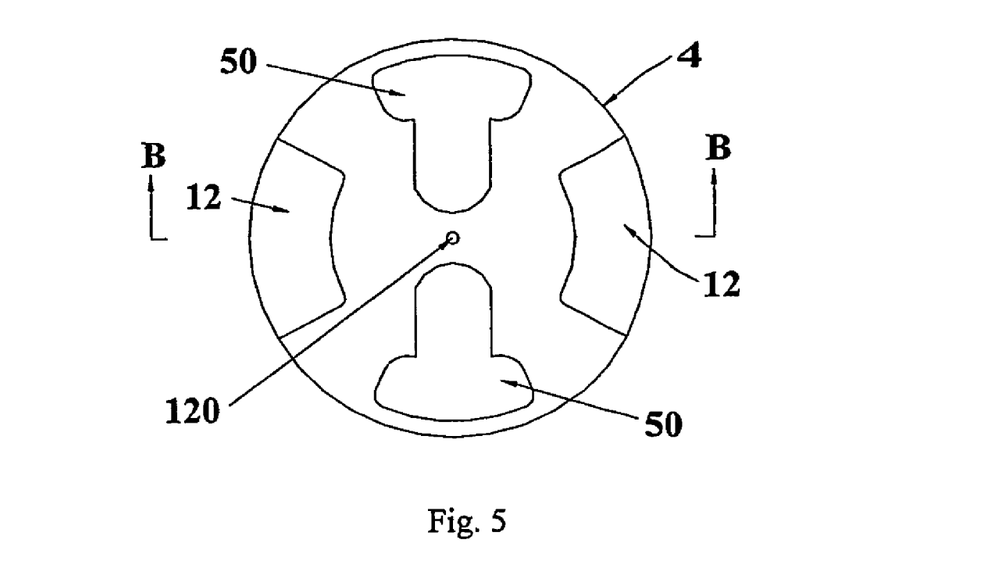
FIG. 5 is a face profile of a valve disc forming part of the valve unit of FIG. 4.
Figure 6:
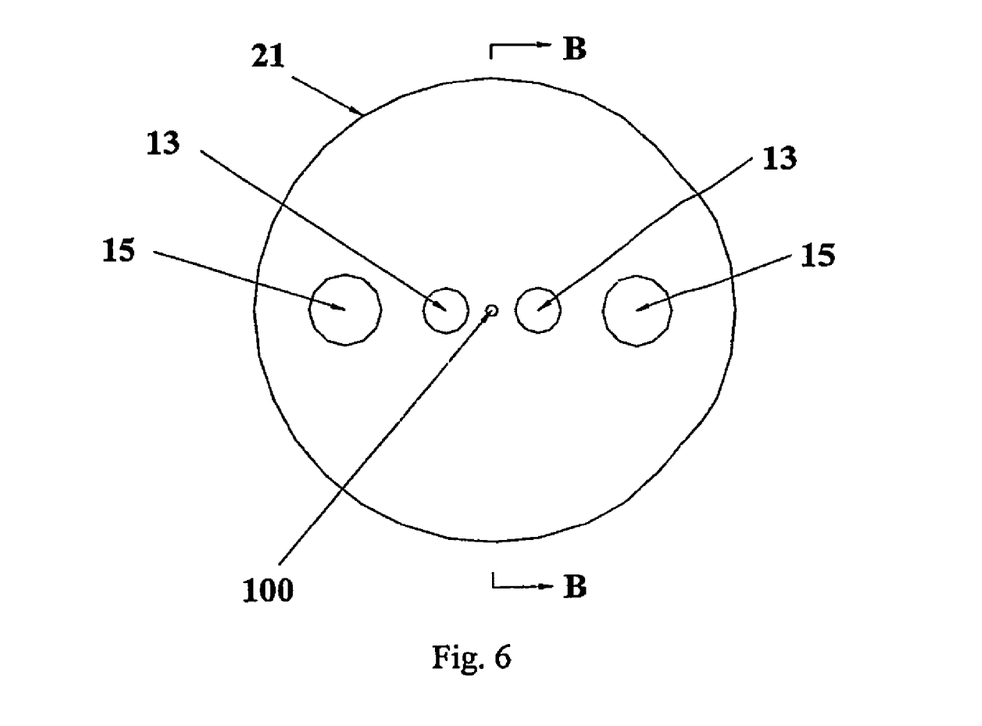
FIG. 6 is a face profile of the valve seat forming part of the valve unit of FIG. 4.

FIGS. 5 and 6 show the porting at the interface of valve disc 4 and valve seat 21 respectively of FIG. 4. Arrows 'B-B' on FIGS. 5 and 6 denote the cross section shown in FIG. 4. High-pressure gas flows through ports 13 in valve seat 21 and into cavities 50 in valve disc 4. Gas that pressurizes cavity 11 in valve disc 4 flows from port 100 in the center of valve seat 21 through center port 120 in valve disc 4.

Figure 7:
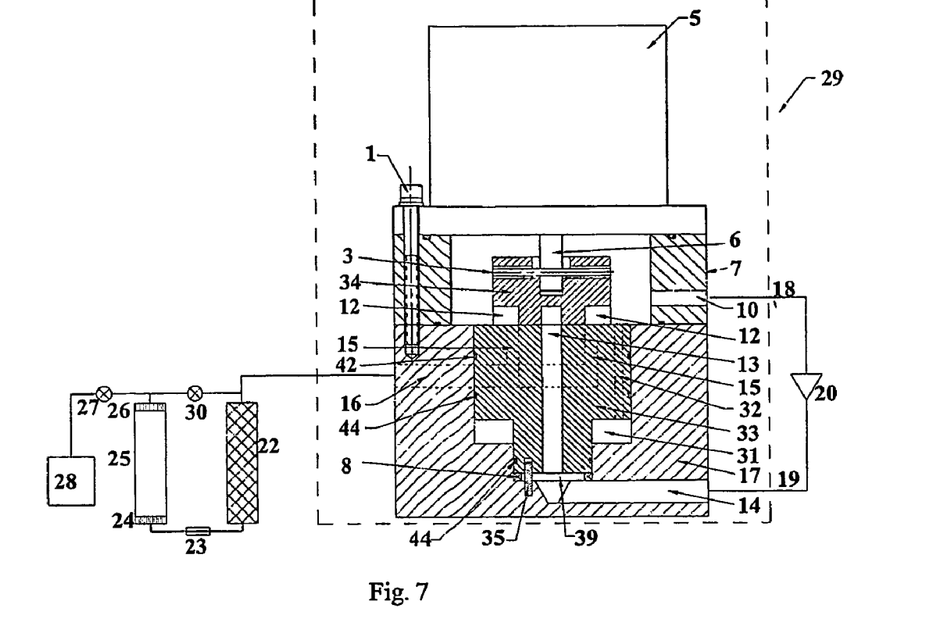
FIGS. 7 and 8 are cross sections of third and fourth embodiments of valve assemblies in accordance with the present invention in which the differential sealing force is located in the valve seat.

FIG. 7 shows a third embodiment of this invention. In FIG. 7, like reference numerals denote like parts in FIG. 1. This embodiment incorporates the same principal of having two different pressures acting on two different surfaces to affect a sealing force between valve disc 34 and seat 33. In this case valve disc 34 is fixed on motor shaft 6 and seat 33 has different gas pressures on two different surfaces to move it axially into contact with valve disc 34.

The distal surfaces of valve seat 33 are separated into two regions. A gas tight seal 43 separates these two regions. The center region 39 having area Ac communicates with the supply side of the compressor 20 through channel 14 and gas line 19. The shoulder region 31 having area As communicates with return side pressure Pl through channel 32, outlet 10 and gas line 18. A spring 8 is used to keep valve disc 34 in contact with valve seat 33 when the refrigerator is off, and to generate an initial force to seal valve seat 33 with valve disc 34 at startup. Valve disc 34 differs from valve disc 4 of FIG. 1 in that it does not have valve holder 2, center hole 41, or cavity 11. Gas flow is the same.

The criteria for having enough force to have a seal on the face of valve disc 34 against seat 33 is similar to that given by equation 3. Ac refers to the surface area at the end of seat 33 in cavity 39, As refers to the annular area in shoulder cavity 31, and Asa refers to the surface area on the face of valve seat 33 that is at the pressure that surrounds valve disc 34. In this embodiment the pressure around valve disc 34 is Pl.

$$(Ac*Ph+As*Pl-Asa*Pl)>Av*(Pv \max - Pl) \qquad \text{Equation 3}$$

Figure 8:
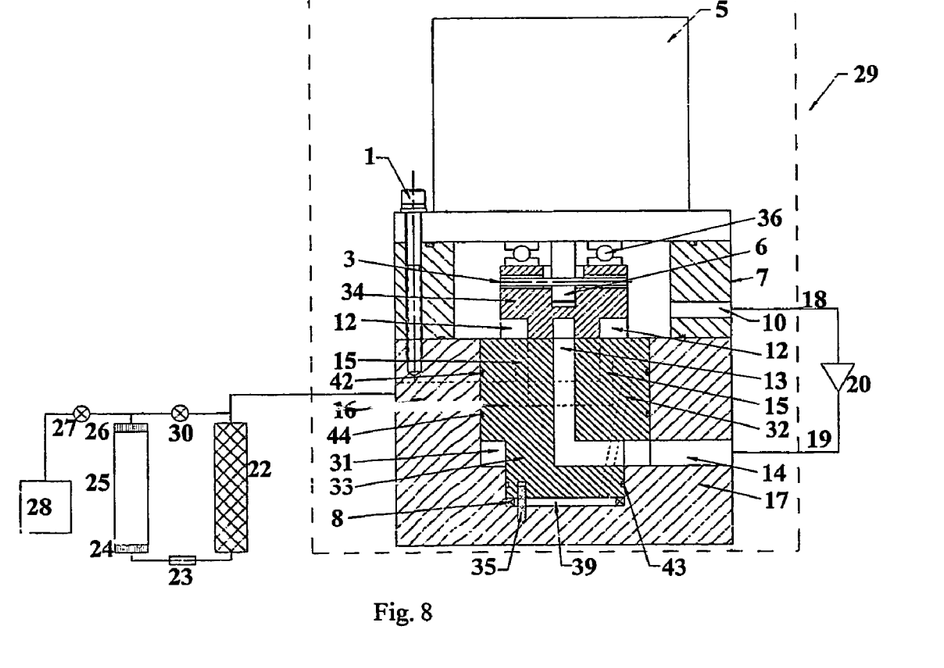

The fourth embodiment of this invention is shown in FIG. 8 where like reference numerals denote like parts in FIG. 7. The basic components are similar to those in the valve unit in FIG. 7 except that the pressure exerted on area Ac in the center region 39 and on the shoulder surface As in cavity 31 are reversed. Center region 39 communicates with low pressure Pl through hole 32 while shoulder region 31 communicates with Ph through channel 14 and gas line 19. The criteria for having a sealing force is, $$(Ac*Pl+As*Ph-Asa*Pl)>Av*(Pv\max-Pl) \quad \text{Equation 4}$$

FIG. 8 shows the option of having a bearing 36 between the distal side of valve disc 34 and the face of motor 5. Bearing 36 carries the axial force, which is equal to the left hand side of equation 4, rather than one of the motor bearings.

Figure 9:
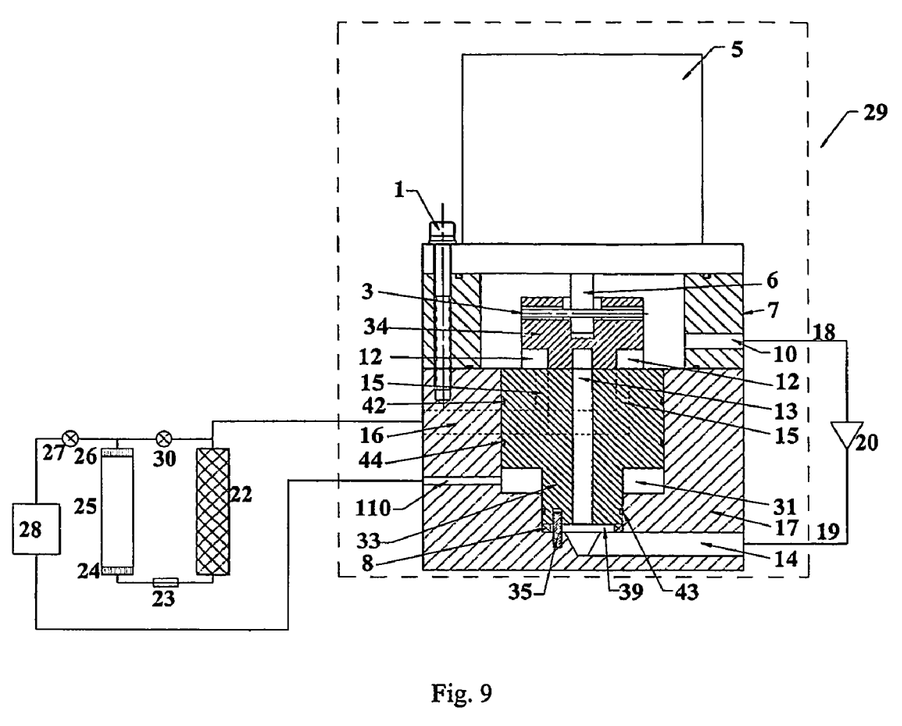
FIGS. 9 and 10 are cross sections of fifth and sixth embodiments of valve assemblies in accordance with the present invention in which buffer gas from the pulse tube provides one of the sealing pressures, acting in the valve seat.

FIG. 9 shows a fifth embodiment of the present invention in which gas from another source is used to pressurize shoulder cavity 31. In FIG. 9 like reference numerals denote like parts in FIG. 7. Assuming that the pressure in cavity 31 is Ps then the criteria that has to be satisfied for sealing is, $$(Ac*Ph+As*Ps-Asa*Pl)>Av*(Pv\max-Pl) \quad \text{Equation 5}$$

Unlike embodiment 2 shown in FIG. 4, Ac can be larger than Av because the diameter of seat 33 does not have a set limit. This means that the value of Ps can be lower and still have a seal. FIG. 9 shows cavity 31 communicating with buffer 28, at pressure Pb, through flow passage 110.

Figure 10:
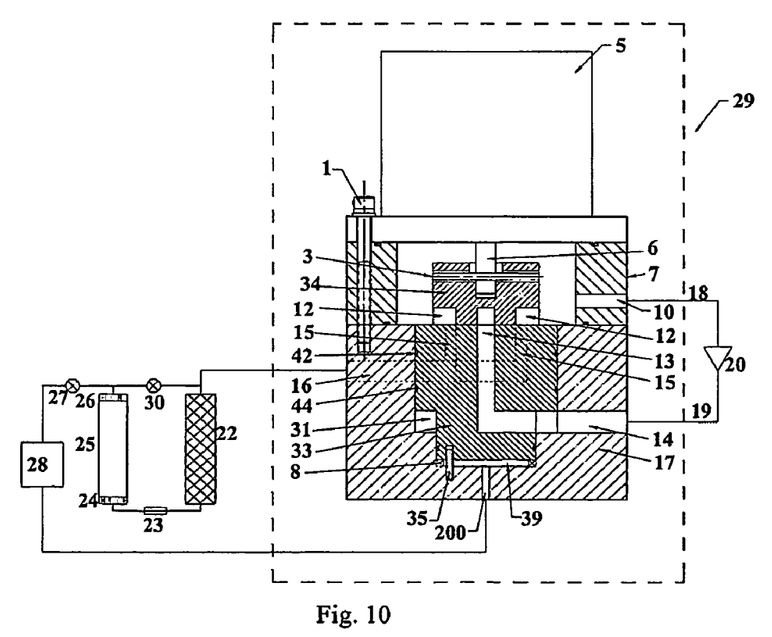

The sixth embodiment of this invention is shown in FIG. 10, where like reference numerals denote like parts in FIG. 9. The basic components are similar to those in the valve unit in FIG. 9 except the pressures in center region 39 and shoulder region 31 are reversed. FIG. 10 shows Pc being provided by Buffer gas at pressure Pb which communicates with center region 39 through channel 200. The relation required for a sealing force is, $$(Ac*Pc+As*Ph-Asa*Pl)>Av*(Pv\max-Pl) \quad \text{Equation 6}$$

It is also recognized that, for embodiments five and six, pressures Pc and Ps can be supplied by another means that can be at a pressure as low as vacuum. It can be any pressure source below Ph, or even sealed with some fixed pressure that is less than Ph. The pressure that is selected needs to be high enough so that the spring 8 which is needed to have the valve disc seal when it is off does not impose excessive force when the refrigerator is operating.

Figure 11:
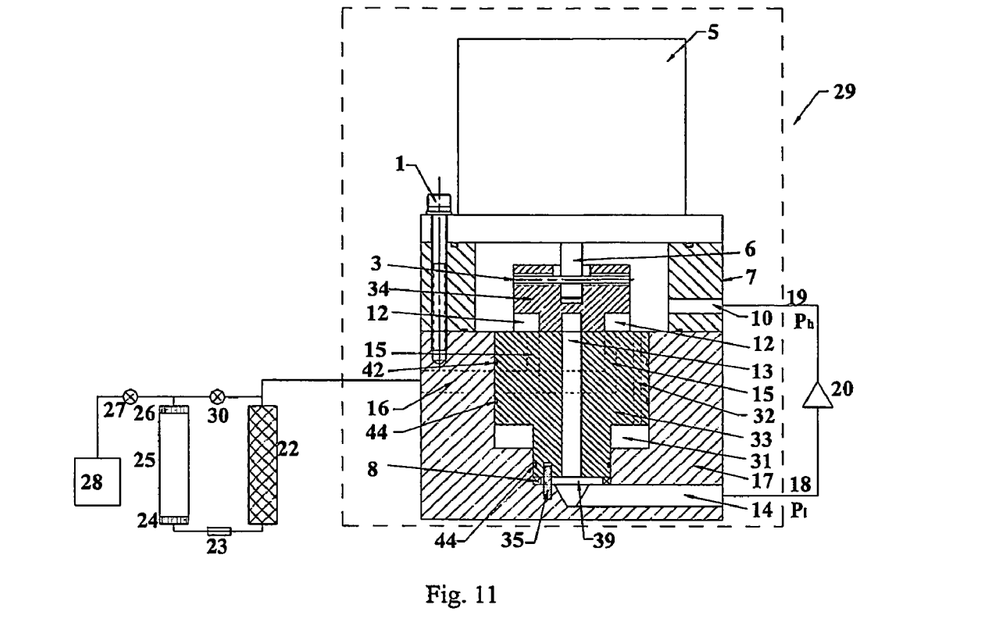
FIG. 11 is a cross section of a seventh embodiment of a valve assembly in accordance with the present invention in which the differential sealing force is located in the valve seat but gas flow is reversed from the previous embodiments.

FIG. 11 shows the seventh embodiment in which the construction of valve assembly 29 is very similar to that of FIG. 7 however the gas flow through the valve disc is in the reverse direction. High-pressure gas line 19 is connected to port 10 on valve assembly 29 and low-pressure gas returns to compressor 20 through port 14 and line 18. This results in the conventional flow of gas through valve disc 34 with high-pressure gas on the outside. With valve disc 34 pinned by 3 to motor shaft 6 the axial load is carried by the motor bearings in the direction toward the valve face. FIG. 11 shows the shoulder area As in 31 being pressurized at Ph, and the surface area Ac in 39 being pressurized by Pl. In a conventional valve assembly the rotary valve disc is not pinned and the axial force is the product Av*(Ph–Pv avg.). The torque required to turn the valve disc can be reduced relative to conventional single piece valve discs by having two different pressures acting on two different surfaces in valve seat 31. In order to reduce the force of valve disc 34 against seat 33 but still have it seal the following relationship must be observed, $$0<(Ac*Pl+As*Ph-Asa*Ph)<Av*(Ph-Pv\max) \quad \text{Equation 7}$$

Figure 12:
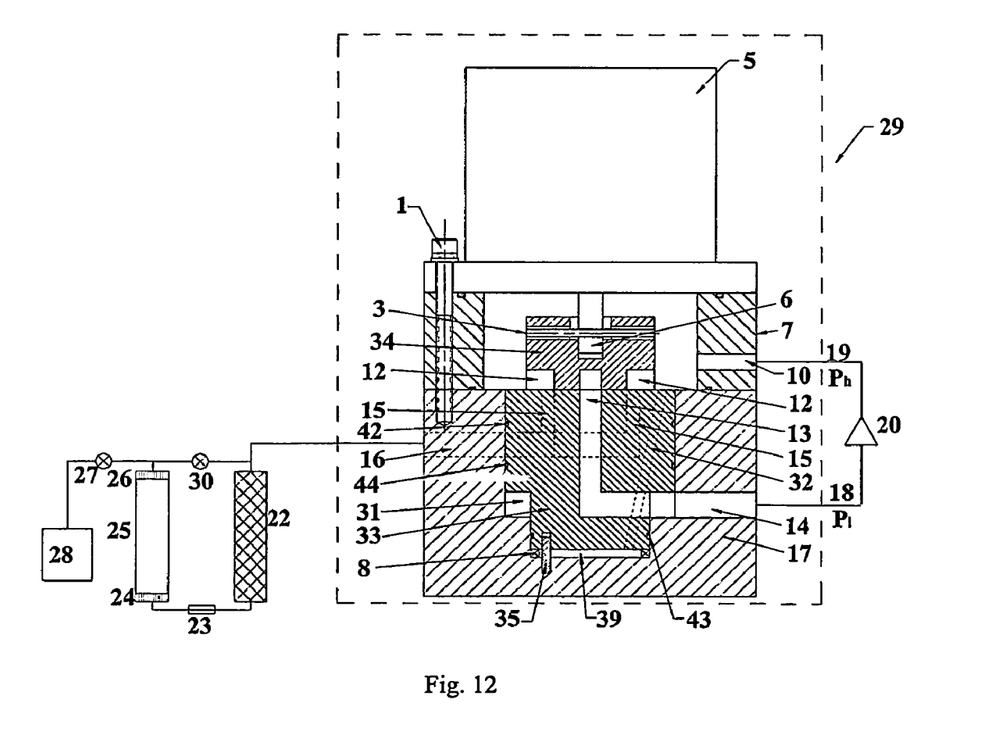
FIG. 12 is a cross section of an eighth embodiment of a valve assembly in accordance with the present invention which is a variation of the seventh embodiment.

The eighth embodiment of this invention as shown in FIG. 12 is similar to the previous embodiment. Like reference numerals denote like parts in FIG. 11. The difference between this embodiment and embodiment seven is that the pressures in shoulder region 31 is Pl and the pressure in center cavity 39 is Ph. The relationship that must be observed in order to reduce the force of valve disc 34 against seat 33, but still have it seal, is similar to equation 7, $$0<(Ac*Ph+As*Pl-Asa*Ph)<Av*(Ph-Pv\max) \quad \text{Equation 8}$$

It is obvious that for embodiments three to eight which have two different pressures acting on two different surfaces in the valve seat, that one or more additional shoulders can be added that are sealed from each other and are independently pressurized from other sources. It would seem to be impractical but not impossible to add additional surfaces at different pressures to the valve discs in embodiments one and two.

Figure 13:
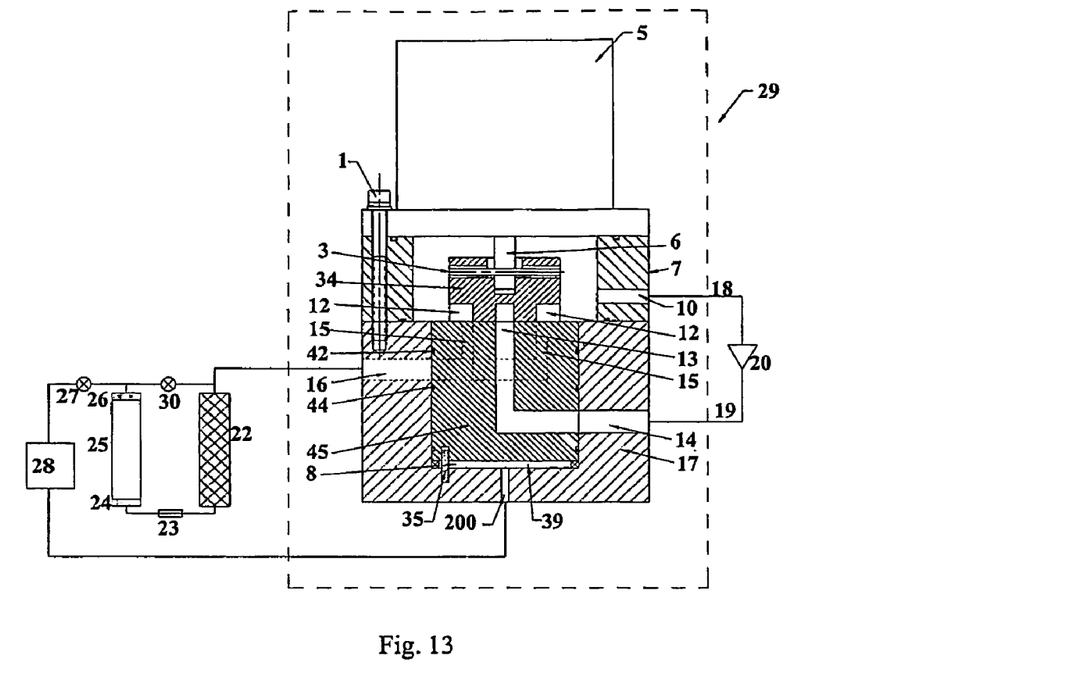
FIG. 13 is a cross section of a ninth embodiment of a valve assembly in accordance with the present invention which is a special case of the sixth embodiment in which buffer gas from the pulse tube provides the sealing pressure acting on one surface of the valve seat.

The ninth embodiment of this invention is shown in FIG. 13, where like reference numerals denote like parts in FIG. 10. This is a special case of embodiment six, FIG. 10, that arises when the criteria of equation 6 is met with As=0. A practical design is to use the buffer gas, as shown in FIG. 13, to pressurize Ac in cavity 39. Other pressures from other sources can also be used.

Figure 14:
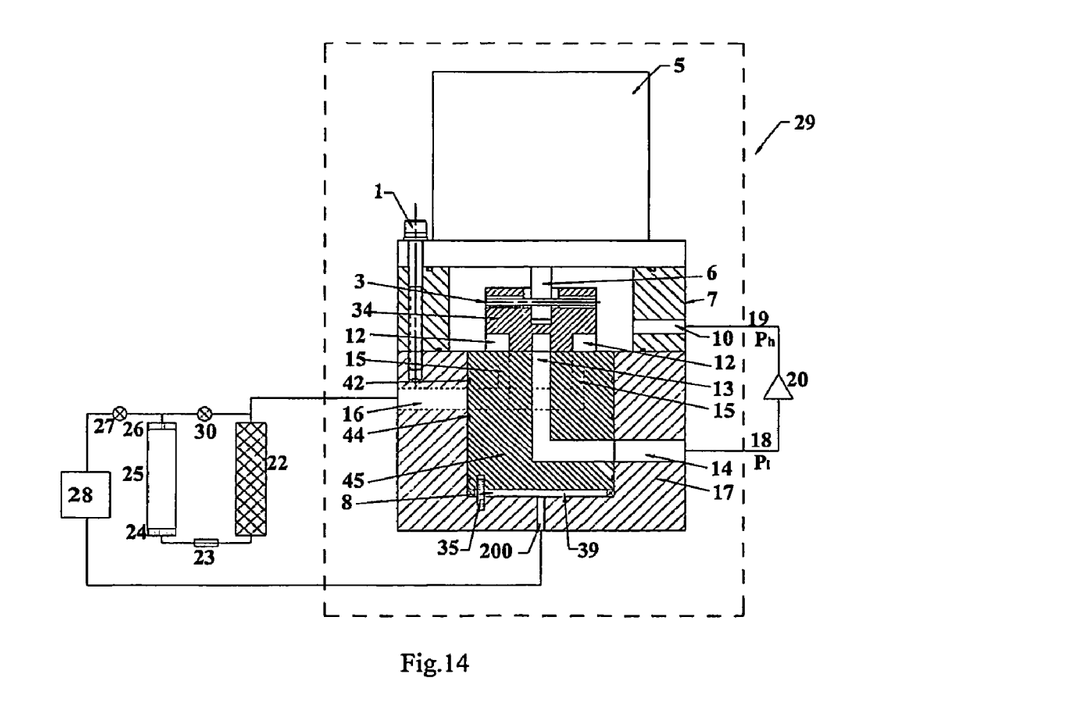
FIG. 14 is a cross section of a tenth embodiment of a valve assembly in accordance with the present invention which is a special case of the eighth embodiment in which buffer gas from the pulse tube provides the sealing pressure acting on one surface of the valve seat.

The tenth embodiment of this invention is shown in FIG. 14, where like reference numerals denote like parts in FIG. 12. This is a special case of embodiment eight, FIG. 12, that arises when the criteria of equation 8 is met with As=0 and the pressure in cavity 39 at a pressure less than Ph. Buffer gas may be used, as shown in FIG. 14, to pressurize Ac in cavity 39. Other pressures from other sources can also be used.

The seventh, eighth, and tenth embodiments shown in FIGS. 11, 12, and 14, all have high pressure gas on the outside of the valve disc and low pressure in the center of the valve disc face. They are not as attractive as the embodiments with high pressure in the center of the valve disc face because wear dust from valve disc 34 tends to blow into the pulse tube or other expander. It does however provide a means of reducing the motor torque, which is particularly important in valves that have more ports than those shown in FIGS. 2, 3, 5, and 6.

The invention claimed is:

1. In a GM, Solvay, or GM type pulse tube refrigerator, a valve assembly comprising:
   a motor driven rotating valve disc which is restrained from moving axially;
   a non-rotating valve seat which can move axially, wherein different pressures exerted against at least two surfaces of the valve seat result in a net force such that the rotating valve disc is forced in a direction toward the valve motor;
   a first of the at least two surfaces of the valve seat is in a central cavity in the valve seat, the cavity being connected to system high-pressure gas;
   a second of the at least two surfaces of the valve seat is in the annular area between the central cavity in the valve seat and the outside of the valve seat where the second surface is connected to one of system low-pressure gas or gas at a pressure between the system high pressure and vacuum; and
   both first and second of the at least two surfaces are distal to the face of the valve disc.

2. A valve assembly in accordance with claim 1 in which the second of the at least two surfaces is connected to pulse tube buffer gas pressure.

3. In a GM, Solvay, or GM type pulse tube refrigerator, a valve assembly comprising:
   a motor driven rotating valve disc which is restrained from moving axially, and
   a non-rotating valve seat which can move axially, wherein different pressures exerted against at least two surfaces of the valve seat result in a net force such that the rotating valve disc is forced in a direction toward the valve motor, and a. a first of the at least two surfaces of the valve seat is in a central cavity in the valve seat, the cavity being connected to one of system low-pressure gas or gas at a pressure between the system high pressure and vacuum;

b. a second of the at least two surfaces of the valve seat is in the annular area between the central cavity in the valve seat and the outside of the valve seat where the second surface is connected to system high pressure; and c. both first and second of the at least two surfaces are distal to the face of the valve disc.

4. A valve assembly in accordance with claim 3 in which said first surface is connected to pulse tube buffer gas pressure.

5. A valve assembly in accordance with claim 1 wherein the first surface of the valve seat is the distal end of the valve seat, the surface being connected to pulse tube buffer gas pressure, and the second surface of the valve seat is in the annular area between the valve disc and the outside of the valve seat and the second surface is connected to one of system low-pressure gas or high-pressure gas.

6. A valve assembly in accordance with claim 1 in which the axial force is carried by one of the valve motor shaft bearings and a separate bearing.

7. In a GM, Solvay, or GM type pulse tube refrigerator a valve assembly comprising:

a. a motor driven rotating valve disc which is restrained from moving axially, b. a non-rotating valve seat which can move axially, c. where different pressures exerted against at least two surfaces of the valve seat result in a net force such that the rotating valve disc is forced in one of the direction toward the valve motor and of the direction away from the valve motor, d. a first of the at least two surfaces of the valve seat is in a central cavity in the valve seat, the cavity being connected to system high-pressure gas, e. a second of the at least two surfaces of the valve seat is in the annular area between the central cavity in the valve seat and the outside of the valve seat where the second surface is connected to one of system low-pressure gas or gas at a pressure between the system high pressure and vacuum, and f. both first and second of the at least two surfaces are distal to the face of the valve disc.

8. A valve disc in accordance with claim 7 in which the force pushes said valve disc in the direction away from the valve motor.

9. A valve seat in accordance with claim 7 in which a. said first surface is the annular area between the valve disc and the outside of the valve seat, said surface being connected to high-pressure, b. at least one second surface distal to said first surface, said surface being connected to one of gas pressure from a pulse tube buffer tank and low-pressure.

10. A valve assembly in accordance with claim 3 where different pressures exerted against the at least two surfaces of the valve seat result in a net force that keeps the valve seat in contact with a face of the valve disc.

* * * * *